United States Patent
Yamanashi

(10) Patent No.: US 9,563,975 B2
(45) Date of Patent: Feb. 7, 2017

(54) MAKEUP SUPPORT APPARATUS AND METHOD FOR SUPPORTING MAKEUP

(71) Applicant: Panasonic Intellectual Property Management Co., Ltd., Osaka (JP)

(72) Inventor: Tomofumi Yamanashi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

(21) Appl. No.: 14/635,310

(22) Filed: Mar. 2, 2015

(65) Prior Publication Data
US 2015/0262403 A1 Sep. 17, 2015

(30) Foreign Application Priority Data
Mar. 13, 2014 (JP) .................. 2014-049835

(51) Int. Cl.
*G06T 11/60* (2006.01)
*G06T 7/00* (2006.01)
*H04N 5/232* (2006.01)

(52) U.S. Cl.
CPC ............ *G06T 11/60* (2013.01); *G06T 7/0042* (2013.01); *G06T 2207/10016* (2013.01); *G06T 2207/10024* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 2012/0223956 A1* | 9/2012 | Saito | ................... | A45D 44/005 345/582 |
| 2013/0169827 A1* | 7/2013 | Santos | ............... | H04N 5/23229 348/207.1 |
| 2013/0216295 A1* | 8/2013 | Wong | ................... | A45D 44/005 401/195 |

FOREIGN PATENT DOCUMENTS

| | | |
|---|---|---|
| JP | 2007-257194 | 10/2007 |
| JP | 2007257194 A * | 10/2007 |

* cited by examiner

*Primary Examiner* — Kee M Tung
*Assistant Examiner* — Yi Wang
(74) *Attorney, Agent, or Firm* — Greenblum & Bernstein, P.L.C.

(57) ABSTRACT

A makeup support apparatus includes an image capturer that captures an image of a user's face, a display that displays the captured image, and a guide superimposer that superimposes a guide image upon the displayed image. The guide image indicates a region of the user's face in which makeup is to be applied.

6 Claims, 7 Drawing Sheets

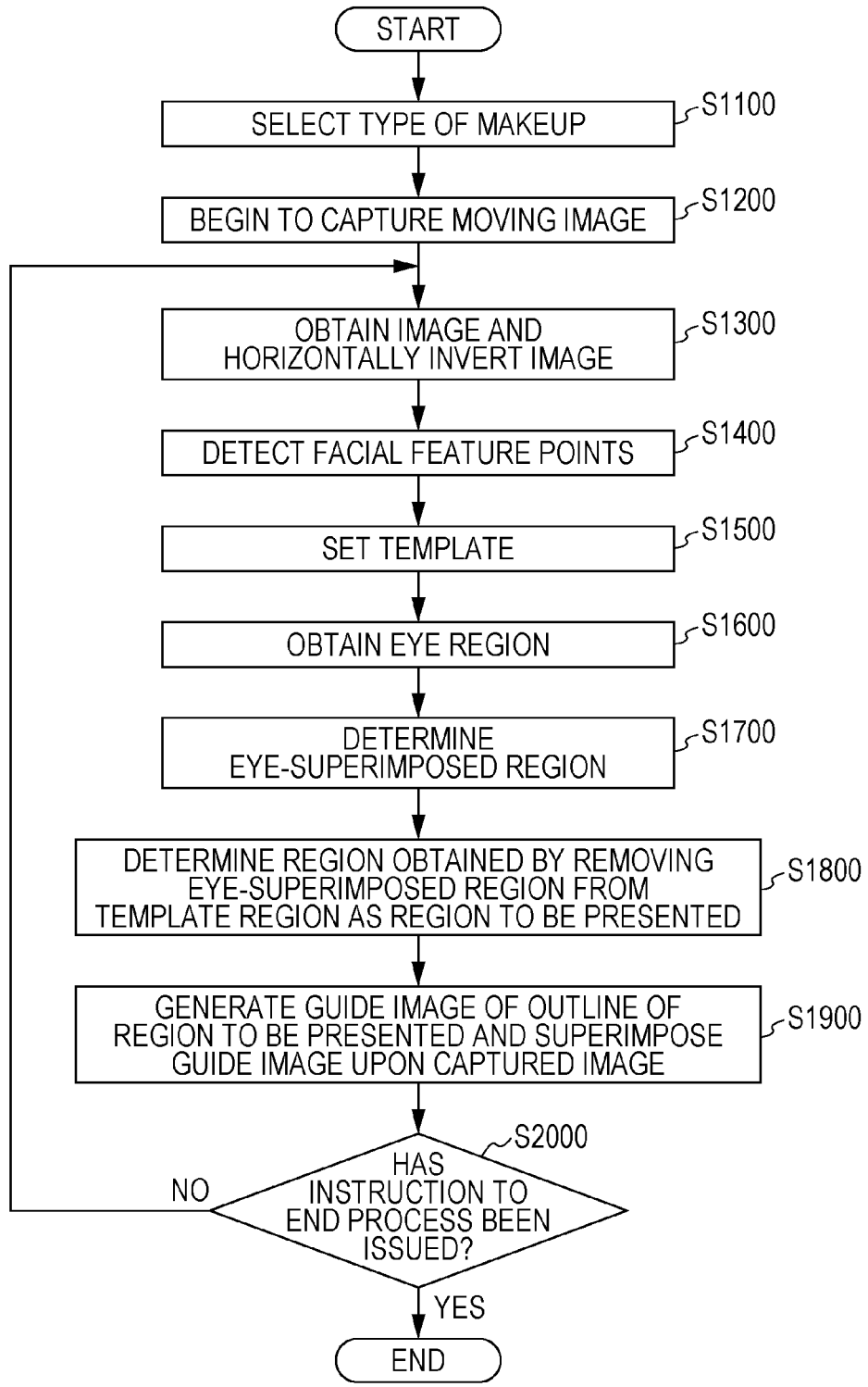

MAKEUP SUPPORT APPARATUS AND METHOD FOR SUPPORTING MAKEUP

BACKGROUND

1. Technical Field

The present disclosure relates to a makeup support apparatus and a method for supporting makeup that support a user in putting on facial makeup.

2. Description of the Related Art

When putting on makeup, people often use others' makeup as references, such as photographs of models included in fashion magazines. However, because the arrangement, shapes, and sizes of facial components (for example, eyes, nose, and mouth) vary between individuals, it is difficult to accurately imitate others' makeup.

Therefore, a technique for displaying a simulated image of a user's face after makeup has been disclosed (for example, refer to Japanese Unexamined Patent Application Publication No. 2007-257194). In the technique disclosed in Japanese Unexamined Patent Application Publication No. 2007-257194 (hereinafter referred to as a "technique disclosed in an example of the related art"), the simulated image of the user's face after makeup is generated by superimposing an image of applied makeup upon a still image of the user's face. According to the technique disclosed in the example of the related art, the user can put on makeup in accordance with the simulated image.

SUMMARY

A simulated image, however, is usually different from an image of the user's actual face before or during makeup. Therefore, the user might not understand how she can achieve the makeup shown in the simulated image, and might accordingly put on an entirely different makeup than intended. For this reason, it is difficult to appropriately support a user in putting on makeup using the technique disclosed in the example of the related art.

One non-limiting and exemplary embodiment provides a makeup support apparatus capable of appropriately supporting the user in putting on makeup.

In one general aspect, the techniques disclosed here feature a makeup support apparatus including an image capturer that captures an image of a user's face, a display that displays the captured image, and a guide superimposer that superimposes a guide image upon the displayed image. The guide image indicates a region of the user's face in which makeup is to be applied.

According to the present disclosure, it is possible to appropriately support the user in putting on makeup.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a flowchart illustrating an example of operations performed by the makeup support apparatus according to the second embodiment;

DETAILED DESCRIPTION

Embodiments of the present disclosure will be described in detail hereinafter with reference to the drawings.

First Embodiment

A first embodiment of the present disclosure is an example of a basic aspect of the present disclosure.

Figure 1:
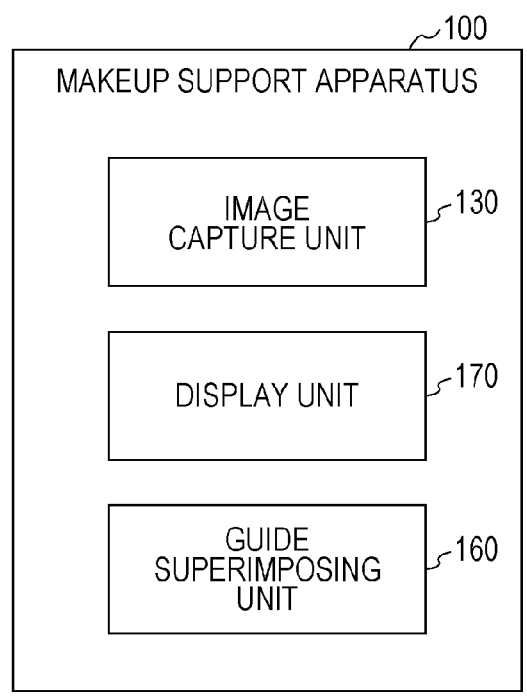
FIG. 1 is a block diagram illustrating an example of the configuration of a makeup support apparatus according to a first embodiment of the present disclosure.

FIG. 1 is a block diagram illustrating an example of the configuration of a makeup support apparatus according to this embodiment.

In FIG. 1, a makeup support apparatus 100 includes an image capture unit 130, a display unit 170, and a guide superimposing unit 160.

The image capture unit 130 includes, for example, a lens and an imaging device and captures an image of a user's face.

The display unit 170 includes, for example, a display device such as a liquid crystal display and displays a captured image.

The guide superimposing unit 160 superimposes, upon a displayed image, a guide image indicating a region of the user's face in which makeup is to be applied.

The makeup support apparatus 100 includes, for example, a central processing unit (CPU), a storage medium storing control programs, such as a read-only memory (ROM), and a working memory such as a random-access memory (RAM), which are not illustrated. The functions of these components are realized by executing the control programs using the CPU.

Since the makeup support apparatus 100 can indicate a region of the user's face in which makeup is to be applied, the makeup support apparatus 100 can appropriately support the user in putting on makeup.

Second Embodiment

A second embodiment of the present disclosure is an example of a specific aspect of the present disclosure for supporting the user in putting on makeup by providing a condition in which the user can feel as if she is using a mirror.

Configuration of Makeup Support Apparatus

Figure 2:
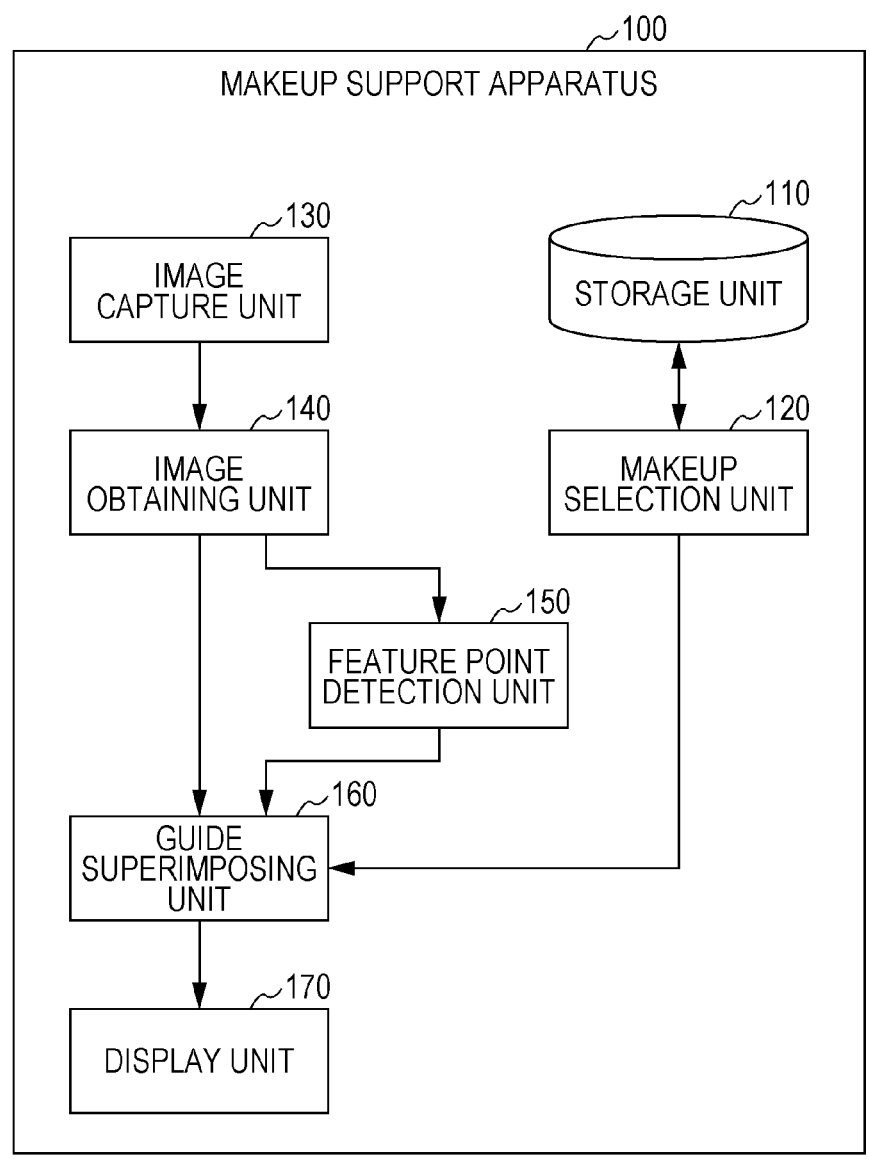
FIG. 2 is a block diagram illustrating an example of the configuration of a makeup support apparatus according to a second embodiment of the present disclosure.

FIG. 2 is a block diagram illustrating an example of the configuration of a makeup support apparatus 100 according to this embodiment. The makeup support apparatus 100 is, for example, a tablet terminal including a touch panel display and a video camera mounted on the same surface thereof.

In FIG. 2, the makeup support apparatus 100 includes a storage unit 110, a makeup selection unit 120, an image capture unit 130, an image obtaining unit 140, a feature point detection unit 150, a guide superimposing unit 160, and a display unit 170.

The storage unit 110 stores in advance makeup information corresponding to a plurality of types of makeup. Here, the types of makeup refer to kinds of makeup and include text information indicating impressions of a face after makeup (hereinafter referred to as "made-up face"), such as "grown-up makeup" and "youthful makeup". The makeup information is information defining a region (hereinafter referred to as an "application region") of a face in which makeup is to be applied as a region relative to feature points on the face. The feature points on a face (hereinafter referred to as "facial feature points") are certain feature (characteristic) points in an image indicating the positions of facial components.

Makeup Information

Figure 3:
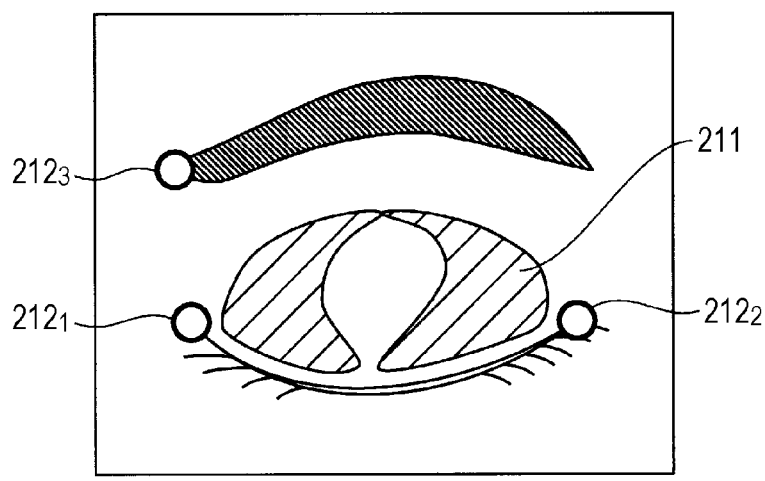
FIG. 3 is a diagram illustrating an example of the content of makeup information according to the second embodiment.

FIG. 3 is a diagram illustrating an example of the content of the makeup information. Here, makeup information defining a region (hereinafter referred to as an "eye makeup region") in which makeup is to be applied to an upper eyelid (hereinafter referred to as "eye makeup") is to be applied will be described.

As illustrated in FIG. 3, in the makeup information, an application region 211 is defined as a region relative to, for example, a facial feature point $212_1$ at an inner corner of the user's eye, a facial feature point $212_2$ at an outer corner of the user's eye, and a facial feature point $212_3$ at an inner corner of the user's eyebrow. The application region 211 defined by such makeup information can be used for eyelids of various sizes and shapes.

The makeup information may be a template image of an application region. The template image includes reference points corresponding to three or more certain facial feature points and defines (an outline of) the application region as a region relative to the reference points. The reference points are points set in the template image and refer to coordinate information at a time when a horizontal x axis and a vertical y axis are provided while determining an upper-left corner of the template image as an origin. The template image may be subjected to an affine transformation by matching the reference points thereof with the corresponding facial feature points. In the following description, the makeup information defining an outline of an application region using a template image will be referred to as a "template". A process for matching the reference points with the corresponding facial feature points and projecting the application region of a template image onto a captured image will be referred to as "setting of a template on a captured image".

The template is generated by, for example, polygonizing image data obtained by adding RGB information to a region corresponding to an application region through a process for detecting the region and a process for extracting a boundary (outline). This generation process may be performed by the makeup selection unit 120 or the guide superimposing unit 160. The polygonization refers to a process for representing a target region as a polygon.

The facial feature points $212_1$ to $212_3$ hardly move even if the user's eye opens and closes. In the following description, facial feature points whose relative positions hardly change due to changes in facial expression will be referred to as "fixed feature points". In this embodiment, the makeup information regarding eye makeup is a template defining, using the fixed feature points as reference points, an outline of the eye makeup region in a state in which the user's eye is closed.

The makeup selection unit 120 illustrated in FIG. 2 refers to the storage unit 110 and displays the text information corresponding to the types of makeup on the touch panel display as options. The makeup selection unit 120 then receives, from the user, an operation for selecting one of the types of makeup. The makeup selection unit 120 need not receive a selection operation performed by the user but may select one of the plurality of types of makeup on the basis of certain criteria relating to the characteristics and age of the user's face. The makeup selection unit 120 then reads makeup information corresponding to the selected type of makeup from the storage unit 110 and outputs the makeup information to the guide superimposing unit 160.

The image capture unit 130 includes, for example, a lens and a color imaging device and captures an image (moving image) of the user's face from a position close to the display unit 170, which will be described later. The image capture unit 130 is, for example, the above-mentioned video camera. The image capture unit 130 sequentially outputs the captured moving image to the image obtaining unit 140.

The image obtaining unit 140 obtains a plurality of images included in the moving image from the input moving image and sequentially outputs images obtained by horizontally inverting the obtained images to the feature point detection unit 150 and the guide superimposing unit 160. The inversion of the images (inversion of the moving image) may be performed by another component, instead. In the following description, images output from the image obtaining unit 140 will be referred to as "captured images".

The feature point detection unit 150 detects the positions of facial feature points of the user in each of the captured images input from the image obtaining unit 140 using a known method for detecting feature points in an image, such as pattern matching. The feature point detection unit 150 then outputs information (hereinafter referred to as "feature point positional information") indicating the detected positions of the facial feature points in each of the captured images to the guide superimposing unit 160.

The facial feature points to be detected by the feature point detection unit 150 (hereinafter referred to as "detection target feature points") at least include facial feature points referred to by the makeup information corresponding to the type of makeup selected by the makeup selection unit 120 (hereinafter referred to as the "selected makeup information"). If the selected makeup information defines the eye makeup region, the detection target feature points at least include facial feature points (hereinafter referred to as "eye edge feature points"), other than the fixed feature points, located at an edge of the upper eyelid.

Detection Target Feature Points

Figure 4:
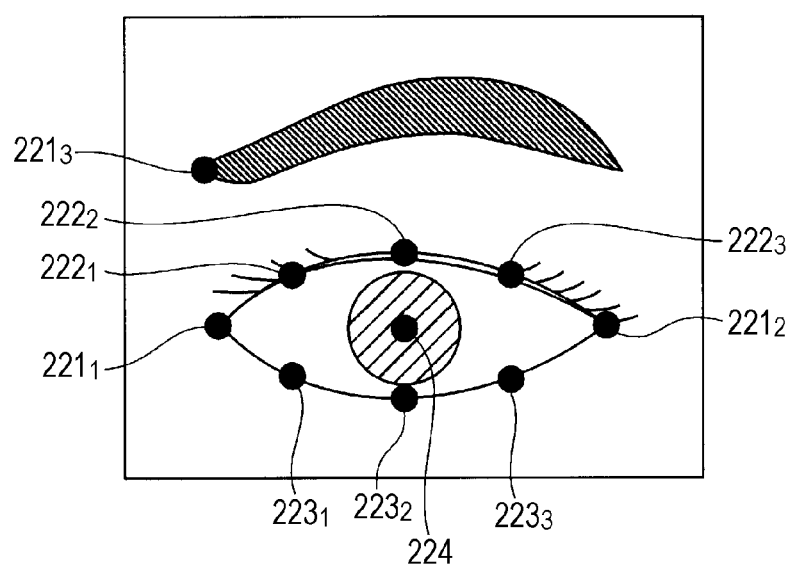
FIG. 4 is a diagram illustrating an example of detection target feature points according to the second embodiment.

FIG. 4 is a diagram illustrating an example of the detection target feature points. Here, an example in which a type of makeup corresponding to the makeup information defining the eye makeup region has been selected will be described.

As illustrated in FIG. 4, the detection target feature points include fixed feature points $221_1$ to $221_3$ and eye edge feature points $222_1$ to $222_3$. The detection target feature points also include facial feature points $223_1$ to $223_3$ located at an edge of a lower eyelid and a facial feature point 224 at the center of the user's eye.

The fixed feature points $221_1$ to $221_3$ make it possible to appropriately set the eye makeup region in the captured image. The eye edge feature points $222_1$ to $222_3$ and the facial feature points $223_1$ to $223_3$ and 224 make it possible to accurately extract a region (hereinafter referred to as an "eye region") in which the user's eyeball is exposed.

The guide superimposing unit 160 illustrated in FIG. 2 generates a guide image indicating an application region on the basis of input feature point positional information and makeup information and superimposes the generated guide image upon an input captured image. The guide superimposing unit 160 outputs an image (hereinafter referred to as an "image obtained as a result of superimposition") obtained by superimposing the guide image upon the captured image to the display unit 170.

The guide image indicates a region of the user's actual face in which makeup is to be applied. The guide image may be an image including lines indicating an outline of the application region, a hatching image, or a translucent image that is relatively transparent, in order not to interfere with display of the actual state of each region of the user's face.

The display unit 170 includes, for example, a liquid crystal display and displays an input image obtained as a result of superimposition. The display unit 170 is, for example, the above-mentioned touch panel display. As described above, the display unit 170 is arranged close to the image capture unit 130, and displays the image obtained as a result of superimposition for a user who is looking at the image capture unit 130. A captured image included in the image obtained as a result of superimposition has been horizontally inverted.

The image obtained as a result of superimposition is generated and displayed in substantially real-time for each image included in a moving image output from the image capture unit 130. Therefore, a plurality of images, which have been obtained as a result of superimposition, displayed by the display unit 170 serve as a moving image (hereinafter referred to as a "guide-superimposed mirror image") obtained by superimposing guide images that follow the movement of the facial feature points upon a mirror image of the original moving image.

The makeup support apparatus 100 includes, for example, a CPU, a storage medium storing control programs, such as a ROM, and a working memory such as a RAM, which are not illustrated. In this case, the functions of the above-described components are realized by executing the control programs using the CPU.

The makeup support apparatus 100 can display, like a mirror, a horizontally inverted image of the user's face and superimpose guide images indicating a region in which makeup is to be applied upon the displayed image of the user's face.

Details of Guide Superimposing Unit

As described above, in this embodiment, the makeup information regarding eye makeup defines, using the fixed feature points around the user's eyelid as the reference points, the eye makeup region corresponding to a state in which the user's eye is closed. In the following description, the makeup information defining the eye makeup region will be referred to as a "template for eye makeup".

By using such a template, it becomes possible to perform a process for setting application regions, including the eye makeup region, in a moving image with a small amount of calculation and keep incorrect guide images from being displayed more certainly. On the other hand, when the user's eye is open, the template for eye makeup does not match the actual shape of the user's eyelid, and the guide-superimposed mirror image becomes unnatural.

Therefore, in the template for eye makeup, the guide superimposing unit 160 detects the eye region in the captured image and performs a process for removing the detected eye region from the application region defined by the template.

Figure 5:
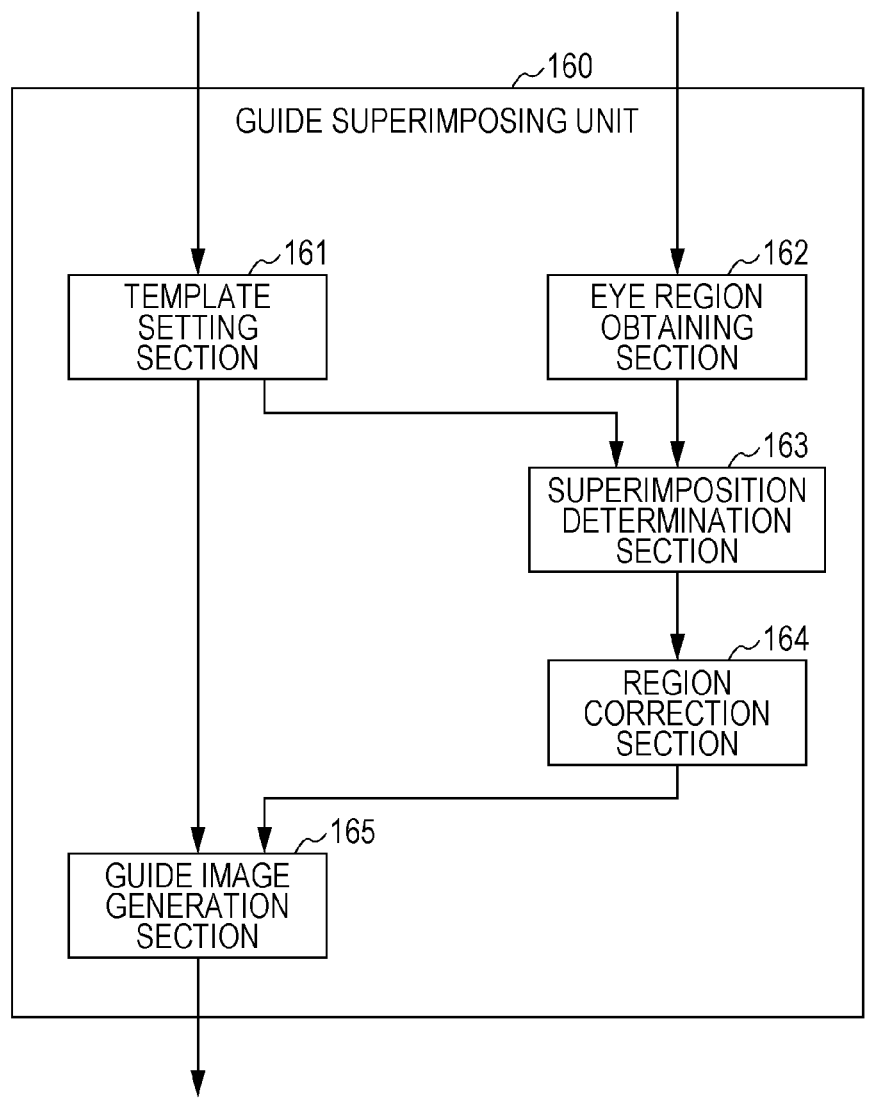
FIG. 5 is a block diagram illustrating an example of the configuration of a guide superimposing unit according to the second embodiment.

FIG. 5 is a block diagram illustrating an example of the configuration of the guide superimposing unit 160.

In FIG. 5, the guide superimposing unit 160 includes a template setting section 161, an eye region obtaining section 162, a superimposition determination section 163, a region correction section 164, and a guide image generation section 165.

The template setting section 161 sets a template (makeup information) in a captured image by matching the positions of fixed feature points referred to by the template (makeup information) with the positions of fixed feature points in the captured image. The template setting section 161 then outputs, to the guide image generation section 165, information (hereinafter referred to as "region information") indicating an application region (hereinafter referred as a "region to be presented") determined by the set template.

In the case of a template for eye makeup, however, the template setting section 161 determines a region defined by the set template as a temporary eye makeup region. The template setting section 161 then outputs information indicating the temporary eye makeup region to the superimposition determination section 163, not to the guide image generation section 165.

The eye region obtaining section 162 obtains an eye region in the captured image on the basis of facial feature points detected from the captured image. The eye region obtaining section 162 then outputs information indicating the obtained eye region to the superimposition determination section 163.

Such facial feature points include, for example, the eye edge feature points $222_1$ to $222_3$ and the facial feature points $223_1$ to $223_3$ and 224 illustrated in FIG. 4. In this case, the eye region obtaining section 162 calculates, for example, a line connecting the fixed feature points $221_1$ and $221_2$ and the eye edge feature points $222_1$ to $222_3$ and a line connecting the fixed feature points $221_1$ and $221_2$ and the facial feature points $223_1$ to $223_3$. The eye region obtaining section 162 then polygonizes a region (a region in which the facial feature point 224 is located) surrounded by these two lines and determines the region as an eye region. The eye region obtaining section 162 desirably performs a known curving process such as spline interpolation on each of the two lines.

The superimposition determination section 163 determines, on the basis of the input information, a region (hereinafter referred to as an "eye-superimposed region") in the temporary eye makeup region in which an eye region is superimposed. More specifically, for example, the superimposition determination section 163 determines, as the eye-superimposed region, a region in which the temporary application region (polygon region) indicated by the template for eye makeup and the eye region (polygon region) overlap. The superimposition determination section 163 then outputs information indicating the determined eye-superimposed region and information indicating the input temporary eye makeup region to the region correction section 164.

The region correction section 164 calculates a region obtained by removing the eye-superimposed region from the temporary eye makeup region on the basis of the input information. That is, the region correction section 164 corrects the eye makeup region on the basis of the eye region. The region correction section 164 then outputs information indicating the calculated eye makeup region (the region to be presented) to the guide image generation section 165 as region information regarding eye makeup.

The guide image generation section 165 generates an image to be superimposed indicating an outline of the region to be presented on the basis of the input region information and superimposes the image upon the captured image. That is, the guide image generation section 165 sequentially generates a guide-superimposed mirror image and outputs the guide-superimposed mirror image to the display unit 170.

Since the makeup support apparatus 100 includes such a guide superimposing unit 160, the makeup support apparatus 100 can easily generate and display guide images that accurately follow opening and closing of the user's eyelid.

Operations Performed by Makeup Support Apparatus

Next, operations performed by the makeup support apparatus 100 will be described.

FIG. 6 is a flowchart illustrating an example of the operations performed by the makeup support apparatus 100. FIGS. 7A to 7D are diagrams illustrating an example of a procedure for generating a guide image using a template for eye makeup and correspond to FIGS. 3 and 4. The same feature points as those illustrated in FIGS. 3 and 4 are given the same reference numerals, and description thereof is omitted.

First, in step S1100 illustrated in FIG. 6, the makeup selection unit 120 selects a type of makeup. The makeup selection unit 120 then outputs makeup information corresponding to the selected type of makeup to the guide superimposing unit 160. Here, makeup information including a template for eye makeup is output to the guide superimposing unit 160.

In step S1200, the image capture unit 130 begins to capture a moving image of the user's face. The image capture unit 130 then sequentially outputs the captured moving image to the image obtaining unit 140.

In step S1300, the image obtaining unit 140 obtains an image from the input moving image. The image obtaining unit 140 then horizontally inverts the obtained image and outputs the image to the feature point detection unit 150 and the guide superimposing unit 160.

In step S1400, the feature point detection unit 150 detects facial feature points in the input image. The feature point detection unit 150 then outputs feature point positional information regarding the detected facial feature points to the guide superimposing unit 160. Alternatively, the feature point detection unit 150 may receive makeup information from the makeup selection unit 120 and detect only facial feature points necessary to generate a guide image.

In step S1500, the template setting section 161 of the guide superimposing unit 160 sets the template of makeup in the captured image on the basis of the input makeup information and feature point positional information. The template setting section 161 then outputs region information indicating an application region determined by the set template to the guide image generation section 165.

Figure 7A:
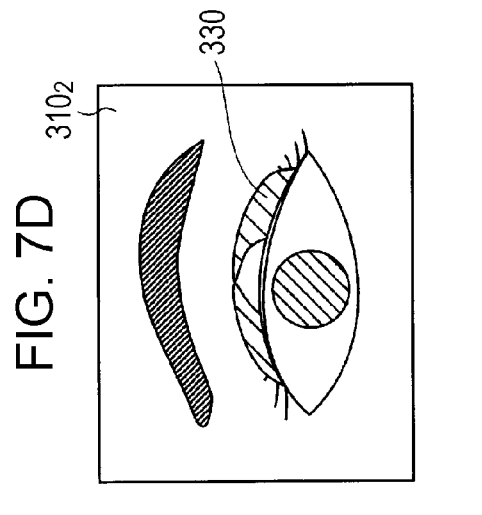
FIGS. 7A to 7D are diagrams illustrating an example of a procedure for generating a guide image according to the second embodiment.
Figure 7B:
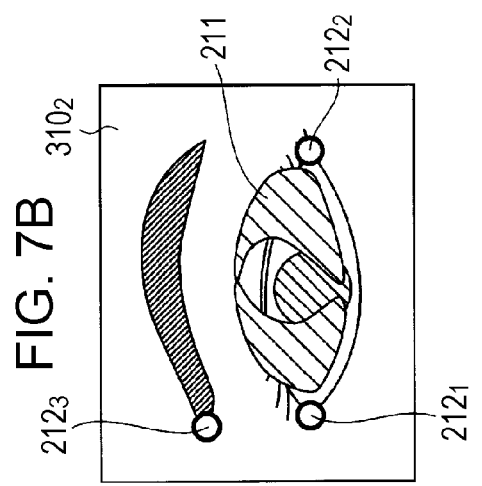

In the case of the template for eye makeup, however, the template setting section 161 sets, as illustrated in FIGS. 7A and 7B, the template in each of a captured image $310_1$ of the user's face in which the user's eye is closed and a captured image $310_2$ of the user's face in which the user's eye is open, and temporarily determines the application region 211. Although, however, the application region 211 based on the template for eye makeup seems natural in the captured image $310_1$ of the user's face in which the user's eye is closed, the application region 211 seems unnatural in the captured image $310_2$ of the user's face in which the user's eye is open as illustrated in FIG. 7B.

Therefore, in the case of eye makeup, the template setting section 161 outputs information indicating a temporary application region determined by the set template to the superimposition determination section 163.

In step S1600 illustrated in FIG. 6, the eye region obtaining section 162 of the guide superimposing unit 160 obtains an eye region of the captured image on the basis of the input feature point positional information. The eye region obtaining section 162 then outputs information indicating the obtained eye region to the superimposition determination section 163.

Figure 7C:
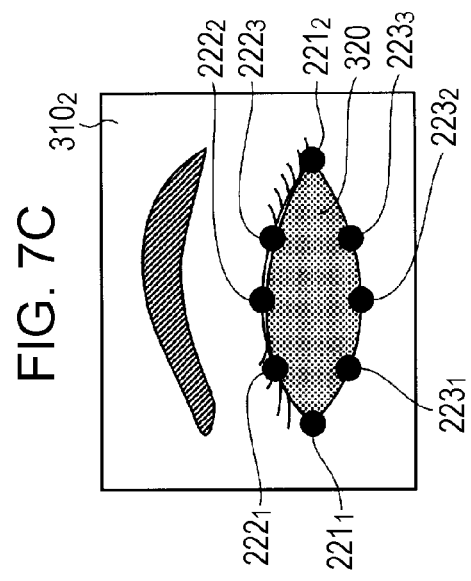

For example, the eye region obtaining section 162 obtains, as illustrated in FIG. 7C, an eye region 320 on the basis of the fixed feature points $221_1$ and $221_2$, the eye edge feature points $222_1$ to $222_3$, and the facial feature points $223_1$ to $223_3$.

In step S1700 illustrated in FIG. 6, the superimposition determination section 163 of the guide superimposing unit 160 determines an eye-superimposed region, which is a portion in which an eye makeup region and an eye region overlap, on the basis of the input information.

The superimposition determination section 163 obtains, for example, a portion in which the application region 211 illustrated in FIG. 7B and the eye region 320 illustrated in FIG. 7C overlap as the eye-superimposed region.

In step S1800 illustrated in FIG. 6, the region correction section 164 of the guide superimposing unit 160 determines a region obtained by removing the eye-superimposed region from the application region 211, which is the region defined by the template, as an application region (hereinafter referred to as a "region to be presented") to be presented. The region correction section 164 then outputs the determined region to be presented for eye makeup to the guide image generation section 165.

Figure 7D:
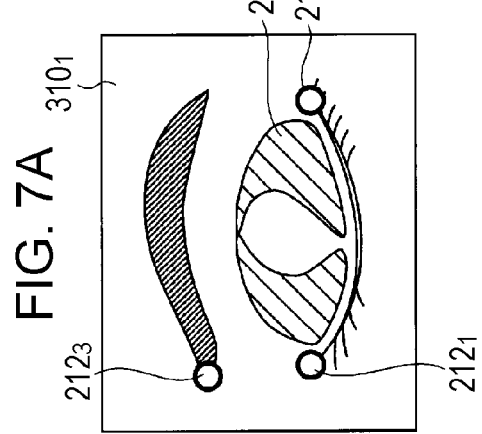

For example, the region correction section 164 determines, as illustrated in FIG. 7D, a region 330 in the application region 211 illustrated in FIG. 7B in which the eye region 320 illustrated in FIG. 7C does not overlap as the region to be presented.

The guide superimposing unit 160 does not perform the processing in steps S1600 to S1800 for makeup other than eye makeup, such as cheek makeup or eyebrow makeup.

In step S1900 illustrated in FIG. 6, the guide image generation section 165 of the guide superimposing unit 160 generates a guide image indicating an outline of the input region to be presented and generates a guide-superimposed mirror image by superimposing (combining) the guide image upon the captured image. The guide image generation section 165 then outputs the generated guide-superimposed mirror image to the display unit 170, which displays the guide-superimposed mirror image.

In step S2000, the image obtaining unit 140 determines whether an instruction to end the process has been issued through a user operation or the like. If an instruction to end the process has not been issued (NO in S2000), the image obtaining unit 140 returns the process to step S1300. If an instruction to end the process has been issued (YES in S2000), the image obtaining unit 140 ends the process.

Figure 8A:
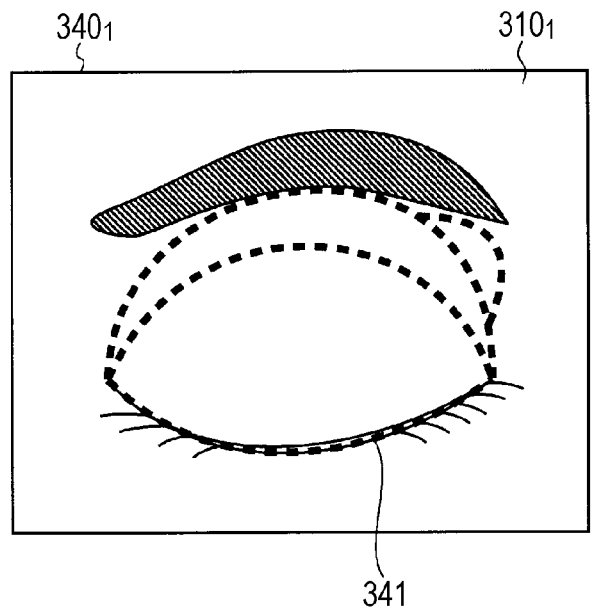
FIGS. 8A and 8B are diagrams illustrating an example of a guide-superimposed mirror image according to the second embodiment.
Figure 8B:
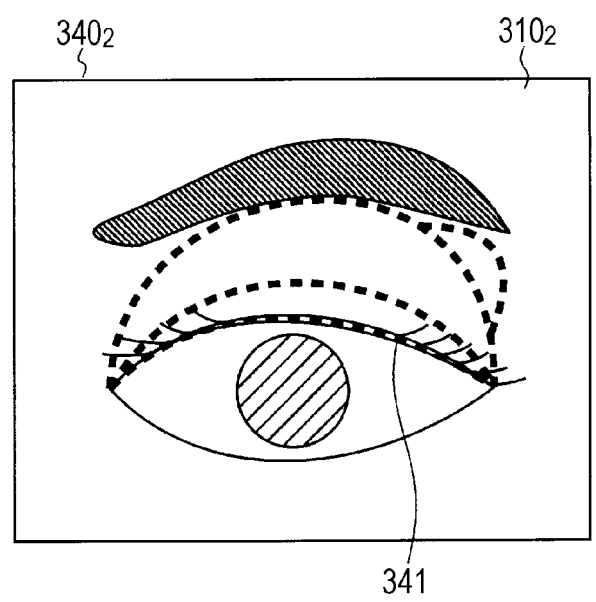

FIGS. 8A and 8B are diagrams illustrating an example of the guide-superimposed mirror image and correspond to FIGS. 7A to 7D.

As illustrated in FIGS. 8A and 8B, a guide image 341 is, for example, an image indicating the outline of the region to be presented using white broken lines. The guide image 341 suits the shape of the user's eyelid in each of a guide-superimposed mirror image $340_1$ based on the captured image $310_1$ of the user's face in which the user's eye is closed and a guide-superimposed mirror image $340_2$ based on the captured image $310_2$ of the user's face in which the user's eye is open. Thus, the guide image 340 follows the movement of the eyelid.

Time taken until the guide-superimposed mirror image is displayed after a corresponding original image is captured can be reduced in accordance with the processing speed of a CPU used, the resolution of the image, the content of the makeup information, and the like. In this case, the displayed guide-superimposed mirror image follows the movement of the user in substantially real-time. The components from the image obtaining unit 140 to the display unit 170 perform stream data processing on the moving image output from the image capture unit 130. Therefore, the user can put on makeup while feeling as if she is using a mirror.

Advantageous Effects Produced by this Embodiment

As described above, the makeup support apparatus 100 according to this embodiment can display the user's face while horizontally inverting the user's face in an image like a mirror. At the same time, the makeup support apparatus 100 can superimpose guide images indicating an application region upon the user's face in the image. The guide images hardly interfere with display of the actual state of each region of the user's face.

By using the makeup support apparatus 100, the user can put on makeup while referring to the guide images, which indicate the application region, that follow the movement of the user's face and feeling as if she is using a mirror.

As described above, in the example of the related art, only a result of makeup is provided, and accordingly the user might undesirably put on an entirely different makeup than intended. In contrast, the makeup support apparatus 100 displays not a result of makeup but information for guiding the user in a procedure of makeup. As a result, the makeup support apparatus 100 can enable the user to put on a makeup that is more similar to an intended one.

Furthermore, in the example of the related art, since the user needs to put on makeup while seeing both a mirror and a simulated image, the user might recognize the location of each region of her face differently between in the mirror and in the simulated image, thereby undesirably applying makeup to an incorrect region. In contrast, since the makeup support apparatus 100 can display the guide-superimposed mirror image in front of the user's face, the user need not see both a mirror and a simulated image. As a result, the makeup support apparatus 100 can enable the user to apply makeup to a correct region.

In addition, if makeup information that defines a region in which eye makeup is to be applied on the basis of the positions of facial feature points on an edge of the user's eye, a complex transformation process might be necessary in which an image close to the user's eyelid needs to be divided into a plurality of regions or more facial feature points need to be used. The makeup support apparatus 100 according to this embodiment, however, determines a region to be presented for eye makeup by calculating a temporary application region using a template for eye makeup in a state in which the user's eye is closed and performing a process for removing an eye region from the temporary application region. Therefore, the makeup support apparatus 100 according to this embodiment can generate and display accurate guide images for eye makeup with a small amount of calculation.

The makeup support apparatus 100 can also display guide images for various types of makeup other than eye makeup, such as lip, cheek, and eyebrow makeup. The makeup support apparatus 100 may use the above-described template for makeup other than eye makeup. Furthermore, the makeup support apparatus 100 can simultaneously generate guide images for a plurality of types of makeup, such as eye makeup and lip makeup, and superimpose the guide images for the plurality of types of makeup upon a single captured image. That is, the makeup support apparatus 100 can display the guide-superimposed mirror image for makeup of the entirety of the user's face.

In addition, an application region defined by makeup information may include a region shared by a plurality of different types of makeup such as eye shadow makeup and eyeliner makeup. In addition, when a simulated image of makeup is displayed, the makeup support apparatus 100 may select color processing in an overlap region from either overlap processing or non-overlap processing. Here, the overlap processing refers to processing in which colors of different types of makeup are combined with each other, and the non-overlap processing refers to processing in which only a color of one of the different types of makeup (a type of makeup applied later in a normal makeup procedure) is displayed. In this case, too, a template may be prepared for each of the different types of makeup.

In addition, the makeup support apparatus 100 may perform, during makeup in which the overlap processing is used, the same process for determining an overlap between regions that is performed when an overlap between a region in which eye makeup is to be applied and an eye region is determined.

For example, in cheek makeup in which a thick color is applied at the center of a pale color, the makeup support apparatus 100 prepares a template of a large, round application region and a template of a small, round application region. In the case of overlap makeup, the makeup support apparatus 100 displays a small, ground guide image after displaying a large, round guide image.

On the other hand, in the case of non-overlap makeup, the makeup support apparatus 100 displays a donut-shaped guide image in which a small circle is arranged inside a large circle. In this case, the makeup support apparatus 100 may determine a region in which application regions of the two templates overlap and generates the donut-shaped guide image by removing the overlap region from the large, round application region.

That is, the makeup support apparatus 100 can generate various guide images with a smaller amount of data and a smaller amount of processing by using template images and performing, as necessary, the process for determining an overlap between regions.

In addition, makeup information need not necessarily be a template. For example, because the color of a lip region is significantly different from the color of skin around the lip region, an outline of the lip region can be easily and accurately extracted on the basis of luminance information regarding a captured image. Therefore, if the type of makeup selected is one in which the user puts on lipstick in the lip region, makeup information may define the lip region as the application region.

In addition, although a case in which a guide image hardly interferes with the actual state of each region of the user's face has been described in this embodiment, the mode of a guide image is not limited to this. For example, the guide superimposing unit 160 may generate a simulated image of eye makeup by superimposing, upon a captured image, an image of an eye makeup region in which makeup has already been applied. If a region to be presented follows opening and closing of the user's eye as illustrated in FIGS. 8A and 8B, a simulated image that more accurately shows the user's face after makeup can be generated than in the example of the related art, in which a region to be presented does not follow opening and closing of the user's eye. Accordingly, an intended makeup can be achieved more easily.

In addition, types of makeup supported by the makeup support apparatus 100 may include not only normal types of makeup but also skin care such as application of facial serum and massage. In this case, it is difficult to understand how to take care of the user's skin only on the basis of a simulated image of the user's face after skin care. However, the makeup support apparatus 100 can appropriately support makeup including skin care by displaying guide images indicating a region in which the user's skin is to be taken care of.

A makeup support apparatus in the present disclosure includes an image capturer that captures an image of a user's face, a display that displays the captured image, and a guide superimposer that superimposes a guide image upon the displayed image. The guide image indicates a region of the user's face in which makeup is to be applied.

In the makeup support apparatus, the image capturer may capture a moving image of the user's face. The display may display a moving image obtained by horizontally inverting the captured moving image. The guide superimposer may superimpose a guide image upon each of a plurality of images included in the displayed moving image.

In the makeup support apparatus, the guide image may be an image including lines indicating an outline of the region.

The makeup support apparatus may further include a feature point detector that detects positions of feature points of the user's face in the image. The guide superimposer may generate the guide image on the basis of both makeup information defining the region relatively to the feature points of the user's face and the detected positions of the feature points.

In the makeup support apparatus, the region may include a region in which eye makeup is to be applied. The feature points may include a feature point located on an edge of an upper eyelid.

In the makeup support apparatus, the makeup information may define the region in which eye makeup is to be applied in a state in which the user's eye is closed on the basis of a feature point that does not move when the user's eye is opened or closed. The makeup support apparatus may further include an eye region obtainer that obtains an eye region in the image. The guide superimposer may superimpose a guide image indicating a region obtained by removing the obtained eye region from the region in which eye makeup is to be applied.

In the makeup support apparatus, the guide superimposer may superimpose, upon the image, an image of makeup applied in the region in which eye makeup is to be applied.

The makeup support apparatus may further include a storage that stores the makeup information defining the region for each of a plurality of types of makeup, and a makeup selector that selects at least one of the plurality of types of makeup. The guide superimposer may superimpose the guide image on the basis of the makeup information for the selected type of makeup.

A method for supporting makeup in the present disclosure includes the steps of capturing an image of a user's face, superimposing, upon the captured image, a guide image indicating a region of the user's face in which makeup is to be applied, and displaying the image upon which the guide image has been superimposed.

The present disclosure is effective as a makeup support apparatus and a method for supporting makeup that appropriately support a user in putting on makeup.

What is claimed is:

1. A makeup support apparatus comprising:
   a storage that stores makeup information defining first regions relative to first feature points of a face, the first feature points including a first group including a first feature point at an inner corner of an eye, a first feature point at an outer corner of the eye, and a first feature point at an inner corner of an eyebrow corresponding to the eye,
   an image capturer that captures an image of a user's face, the makeup information being stored before the image capturer captures the image of a user's face, the user's face being different from the face;
   a display that displays the captured image; and
   a guide superimposer that superimposes, upon the displayed image, a guide image, generated based on the makeup information and the captured image, the guide superimposer being configured to match positions of predetermined feature points related to the stored makeup information with corresponding feature points in the captured image,
   wherein the guide image indicates a region of the user's face in which makeup is to be applied,
   a feature point detector that detects positions of second feature points in the captured image,
   the guide superimposer includes an eye region obtainer that obtains an eye region in the captured image,
   wherein the first regions include a first region relative to the first group, the first region being defined with the eye being closed,
   wherein the region includes a region in which eye makeup is to be applied,
   wherein the second feature points include a second feature point located on an edge of an upper eyelid of the user and a second group including a second feature point at an inner corner of an eye of the user, a second feature point at an outer corner of the eye of the user, and a second feature point at an inner corner of an eyebrow of the user corresponding to the eye of the user, the captured image including an image in which the eye of the user is open,
   wherein a temporary eye makeup region is obtained based on the first region, the first group, the second feature point located on the edge of the upper eyelid of the user, and the second group, and
   wherein a first guide image indicates a region obtained by removing the obtained eye region from the temporary eye makeup region, the guide image including the first guide image.

2. The makeup support apparatus according to claim 1, wherein the guide image is an image including lines indicating an outline of the region.

3. The makeup support apparatus according to claim 1, wherein the guide superimposer generates the guide image on the basis of both the makeup information and the detected positions of the second feature points.

4. The makeup support apparatus according to claim 1, the guide superimposer comprising a template setter that determines a makeup information template with respect to the captured image of the user's face based upon the stored makeup information and feature point positional information and outputs information indicating a makeup application region to a guide image generator that generates the guide image.

5. The make up support apparatus according to claim 1, wherein the storage stores make up information related to a plurality of types of makeup to enable the user's face to achieve correspondingly different impressions by the applied makeup.

6. A method, comprising:
- storing makeup information defining first regions relative to first feature points of a face, the first feature points include a first group including a first feature point at an inner corner of an eye, a first feature point at an outer corner of the eye, and a first feature point at an inner corner of an eyebrow corresponding to the eye, and
- capturing an image of a user's face, after the storing of the makeup information, the user's face being distinct from the face;
- superimposing, upon the captured image, a guide image generated based on the makeup information and the captured image, the guide image indicating a region of the user's face in which makeup is to be applied, the superimposing matching positions of predetermined feature points related to the stored makeup information with corresponding feature points in the captured image; and
- detecting positions of second feature points in the captured image;
- obtaining an eye region in the captured image, and
- displaying the image upon which the guide image has been superimposed, wherein the first regions include a first region relative to the first group, the first region being defined with the eye being closed, wherein the region includes a region in which eye makeup is to be applied, wherein the second feature points include a second feature point located on an edge of an upper eyelid of the user and a second group including a second feature point at an inner corner of an eye of the user, a second feature point at an outer corner of the eye of the user, and a second feature point at an inner corner of an eyebrow of the user corresponding to the eye of the user, the captured image including an image in which the eye of the user is open, wherein a temporary eye makeup region is obtained based on the first region, the first group, the second feature point located on the edge of the upper eyelid of the user, and the second group, and wherein a first guide image indicates a region obtained by removing the obtained eye region from the temporary eye makeup region, the guide image including the first guide image.

\* \* \* \* \*